Dec. 29, 1953  W. F. DART  2,663,941
MEASURING TAPE
Filed Sept. 18, 1952

INVENTOR.
William F. Dart
BY
Attorney.

Patented Dec. 29, 1953

2,663,941

UNITED STATES PATENT OFFICE 2,663,941

MEASURING TAPE

William F. Dart, Mason, Mich., assignor to Dart Manufacturing Company, Mason, Mich., a corporation of Michigan Application September 18, 1952, Serial No. 310,235

8 Claims. (Cl. 33—138)

This invention relates to improvements in measuring tapes.

The main objects of this invention are:

First, to provide a measuring tape of the spring winding reel type with a detachably mounted permanent magnet which can be quickly and easily applied to the tape or removed therefrom and at the same time when applied is securely retained.

Second, to provide a measuring tape of this character in which the permanent magnet may be formed as an integral casting or molded integrally.

Objects relating to details and economies of the invention will appear from the description to follow. The invention is defined and pointed out in the claims.

A preferred embodiment of the invention is illustrated in the accompanying drawing, in which.

Figure 1:
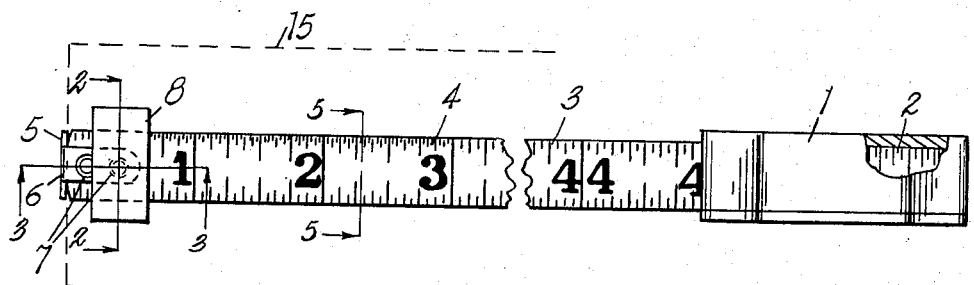
Fig. 1 is a fragmentary plan view of a measuring tape embodying my invention with the tape partially in extended position, its relation to an object to be measured being indicated by dotted lines.
Figure 2:
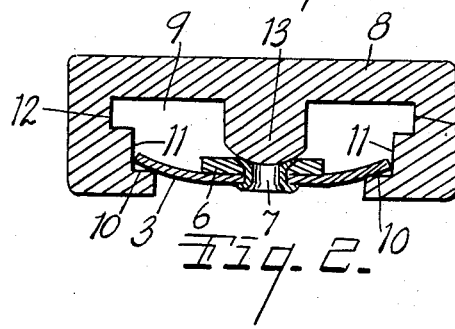
Fig. 2 is an enlarged transverse section on a line corresponding to line 2—2 of Fig. 1.

The embodiment of my invention illustrated comprises the reel housing 1, the reel being conventionally illustrated at 2 therein. The steel tape 3 is of curved cross section and is provided with scale indicia designated generally by the numeral 4 on its concavedly curved face. The terminal hook and finger piece 5 is provided with a shank 6 which is lapped upon the tape and secured thereto by means of the tubular rivets 7 with the hook projecting on its convexedly curved side.

The details of the reel and housing are not illustrated herein as they form no part of my present invention. They may be that shown in my Patent No. 2,599,320, issued June 3, 1952.

The permanent magnet element 8 is block-like in shape and is provided with a recess 9 on its inner side shaped to define inwardly facing tape supporting seats 10 with side walls 11 and lateral extensions 12 above the side walls 11. A central lug 13 having a convexedly curved face 14 is disposed centrally relative to the seats 10.

The side walls 11 of the seats are spaced so that they engage the edges of the tape 3 when it is arranged upon the seats 10. The lug 13 is of such depth as to engage the tape centrally between the seats with the tape under spring tension thrust supporting engagement with the seats.

Figure 4:
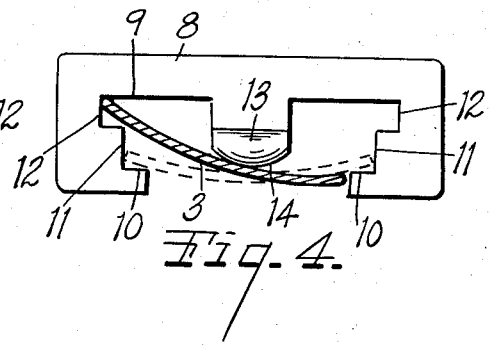
Fig. 4 is a view of the magnet with the tape shown in section in full lines indicating a step of manipulating it to the seated position shown by dotted lines.
Figure 3:
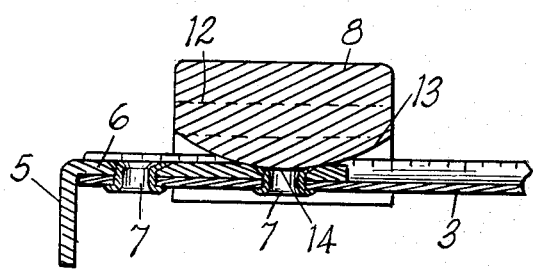
Fig. 3 is an enlarged fragmentary detail view on a line corresponding to 3—3 of Fig. 1.
Figure 5:
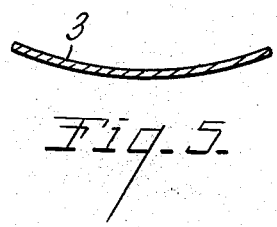
Fig. 5 is a cross sectional view of the tape on a line corresponding to 5—5 of Fig. 1.

In the embodiment of my invention illustrated the lug may be engaged with one of the rivets 7 which constitutes a keeper. The spring tension of the tape holds the lug in engagement with the keeper and in effect clamps the tape upon the seats. In Fig. 4 I have illustrated the manipulation of the tape and the magnet element in engaging the magnet with and disengaging it from the tape. In this manipulation the tape is desirably twisted somewhat and slipped into the recess of the magnet element, which may be held in one hand, to the position shown in Fig. 4 with the edge of the tape extending into one of the recess extensions 12. The tape is then swung back to the position shown by dotted lines in Fig. 4 and the magnet element slipped along longitudinally of the tape to bring the lug 13 into engagement with a rivet which constitutes a keeper. This places the tape under further spring tension.

There are many instances, for example, in measuring metal objects, as indicated at 15 in Fig. 1, such as pipe or sheets or strips of metal which are of considerable length or dimensions where it is impossible for the user to hold the outer end of the tape to the work and at the same time extend the tape. With my invention the hook can be engaged with the end or an edge of the metal object to be measured and the magnet securely retains it. The operator can extend the tape as much as desired, of course, within the capacity of the tape. There are many instances where it is not necessary or desirable to have the magnet on the tape and it can be readily removed and replaced as may be desired.

I have illustrated my invention in a highly practical embodiment thereof. I have not attempted to illustrate or describe other embodiments or adaptations as it is believed this disclosure will enable those skilled in the art to embody or adapt my invention as may be desired.

Having thus described my invention, what I claim as new and desire to secure by Letters Patent is:

1. The combination in a tape measure including a tape reel and a housing therefor, of a flexible metal tape of curved cross section provided with scale indicia on its concavedly curved face a terminal hook for said tape provided with a shank lapped upon the tape and secured thereto by a tubular rivet, and a detachable block-like permanent magnet having a downwardly facing recess on its underside, the side walls of the recess being stepped to define inwardly facing tape seats with side walls and lateral recess extensions above the seat side walls, the distance between the side walls of the seats being approximately the width of the tape, and a downwardly extending lug having a convexedly curved face disposed centrally relative to the seats to engage the tape when it is disposed upon the seats under spring tension, the said lateral extensions receiving an edge of the tape when the tape and magnet are tilted relative to each other to facilitate engagement of the magnet with the tape, said rivet constituting a keeper for said lug.

2. The combination in a tape measure including a tape reel and a housing therefor, of a flexible metal tape, a terminal hook for said tape provided with a shank lapped upon the tape and secured thereto by a tubular rivet, and a detachable permanent magnet having a recess with stepped side walls defining inwardly facing tape seats with side walls and lateral recess extensions above the seat side walls, and a lug having a convexedly curved face disposed centrally relative to the seats to engage the tape when it is disposed upon the seats under spring tension, the said lateral extensions receiving an edge of the tape when the tape and magnet are tilted relative to each other to facilitate engagement of the magnet with the tape, said rivet constituting a keeper for said lug.

3. The combination in a tape measure including a tape reel and a housing therefor, of a flexible resilient tape of curved cross section provided with scale indicia on its concavedly curved face, and a detachable permanent magnet having a recess on its inner side, the side walls of the recess being stepped to define inwardly facing tape seats and a lateral recess extension above one of the seat side walls, a lug having a convexedly curved face disposed centrally relative to the seats to engage the tape when it is disposed upon the seats under spring tension, the said lateral recess extension receiving an edge of the tape when the tape and magnet are tilted relative to each other to facilitate engagement of the magnet with the tape.

4. The combination in a tape measure including a tape reel and a housing therefor, of a flexible resilient tape, and a detachable permanent magnet having a recess on its inner side, the side walls of the recess being stepped to define inwardly facing tape seats and a lateral recess extension above one of the seat side walls, a lug disposed centrally relative to the seats to engage the tape when it is disposed upon the seats under spring tension, the said lateral recess extension receiving an edge of the tape when the tape and magnet are tilted relative to each other to facilitate engagement of the magnet with the tape.

5. The combination in a tape measure including a tape reel and a housing therefor, of a flexible resilient tape, a terminal hook for said tape provided with a shank lapped upon the tape and secured thereto by a tubular rivet, and a detachable permanent magnet having a recess defining spaced inwardly facing tape seats and a lug disposed to engage the tape intermediate the seats when it is disposed upon the seats under spring tension, said rivet constituting a keeper for said lug.

6. The combination of a flexible resilient measuring tape, a terminal hook for said tape provided with a shank lapped upon the tape and secured thereto by a rivet, and a permanent magnet element having a recess on its inner side, the walls of the recess being stepped to define inwardly facing tape seats with side walls spaced to correspond to the width of the tape, and a lug disposed centrally relative to the side walls of the seat to engage the adjacent side of the tape disposed upon the seats under spring tension with its edges in engagement with the side walls of the seats, the rivets constituting a keeper with which the lug is engaged when the magnet element is in adjusted position upon the tape.

7. The combination of a flexible resilient measuring tape, and a permanent magnet element having a recess on its inner side, the walls of the recess being stepped to define inwardly facing tape seats with side walls spaced to correspond to the width of the tape, and a lug disposed centrally relative to the side walls of the seats to engage the adjacent side of the tape disposed upon the seats under spring tension with its edge in engagement with the side walls of the seats.

8. The combination of a flexible resilient measuring tape, and a permanent magnet element having a recess on one side thereof defining inwardly facing tape seats spaced to supportingly engage opposite edge portions of the tape when it is disposed in the recess, and a lug disposed centrally relative to the seats and engaging the inner side of the tape between the seats with the tape in engagement with the seats under spring tension and thereby holding the magnet in its adjusted position on the tape.

WILLIAM F. DART.

References Cited in the file of this patent

UNITED STATES PATENTS

| Number | Name | Date |
|---|---|---|
| 1,530,323 | Pratt | Mar. 17, 1925 |
| 2,036,720 | Ritter | Apr. 7, 1936 |

FOREIGN PATENTS

| Number | Country | Date |
|---|---|---|
| 514,254 | Great Britain | Nov. 3, 1939 |